Aug. 2, 1927.
C. R. H. BONN
1,637,927
FLOW METER
Filed Jan. 25, 1924      2 Sheets-Sheet 2
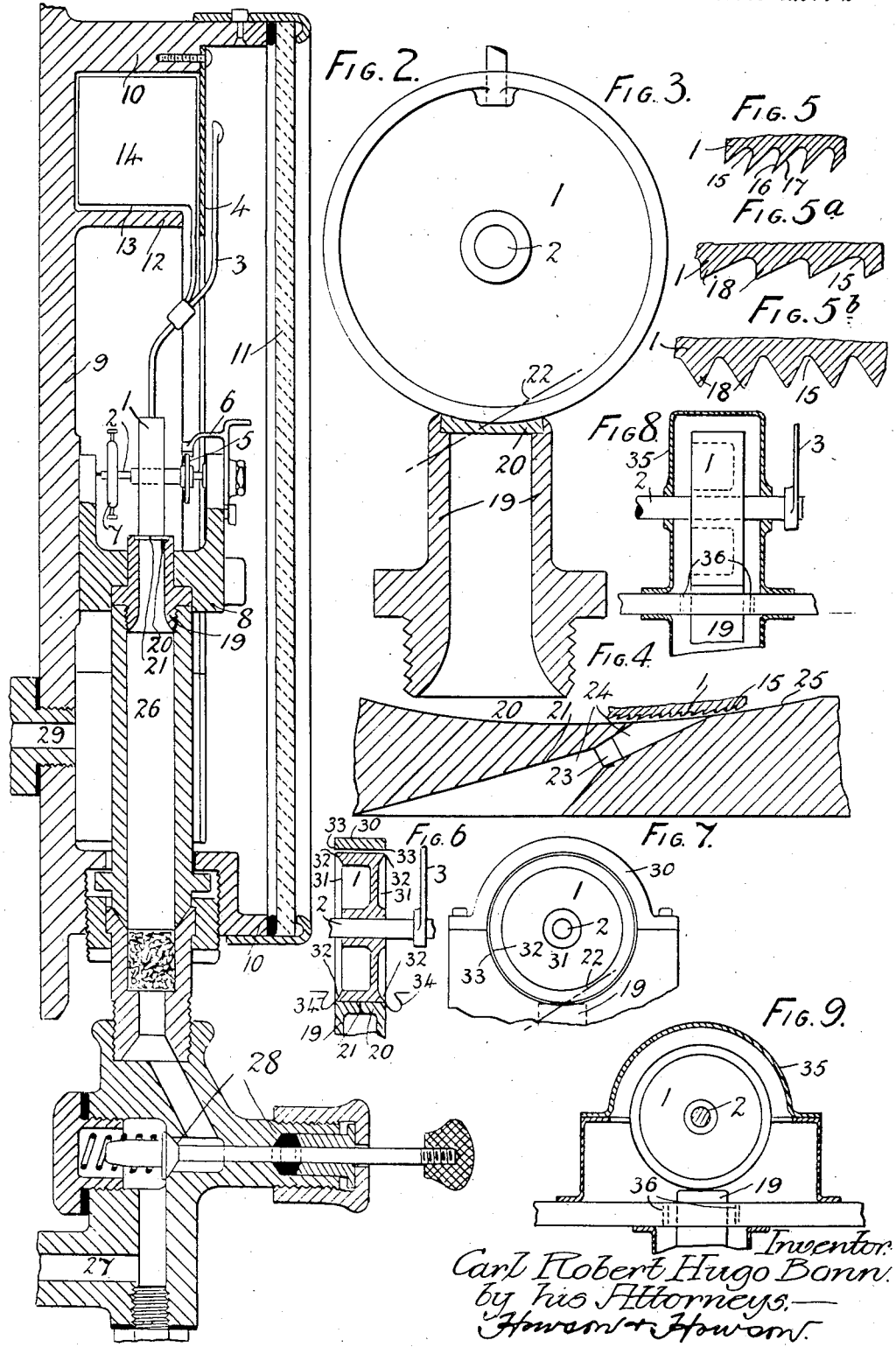
Inventor.
Carl Robert Hugo Bonn.
by his Attorneys.—
Howson + Howson.

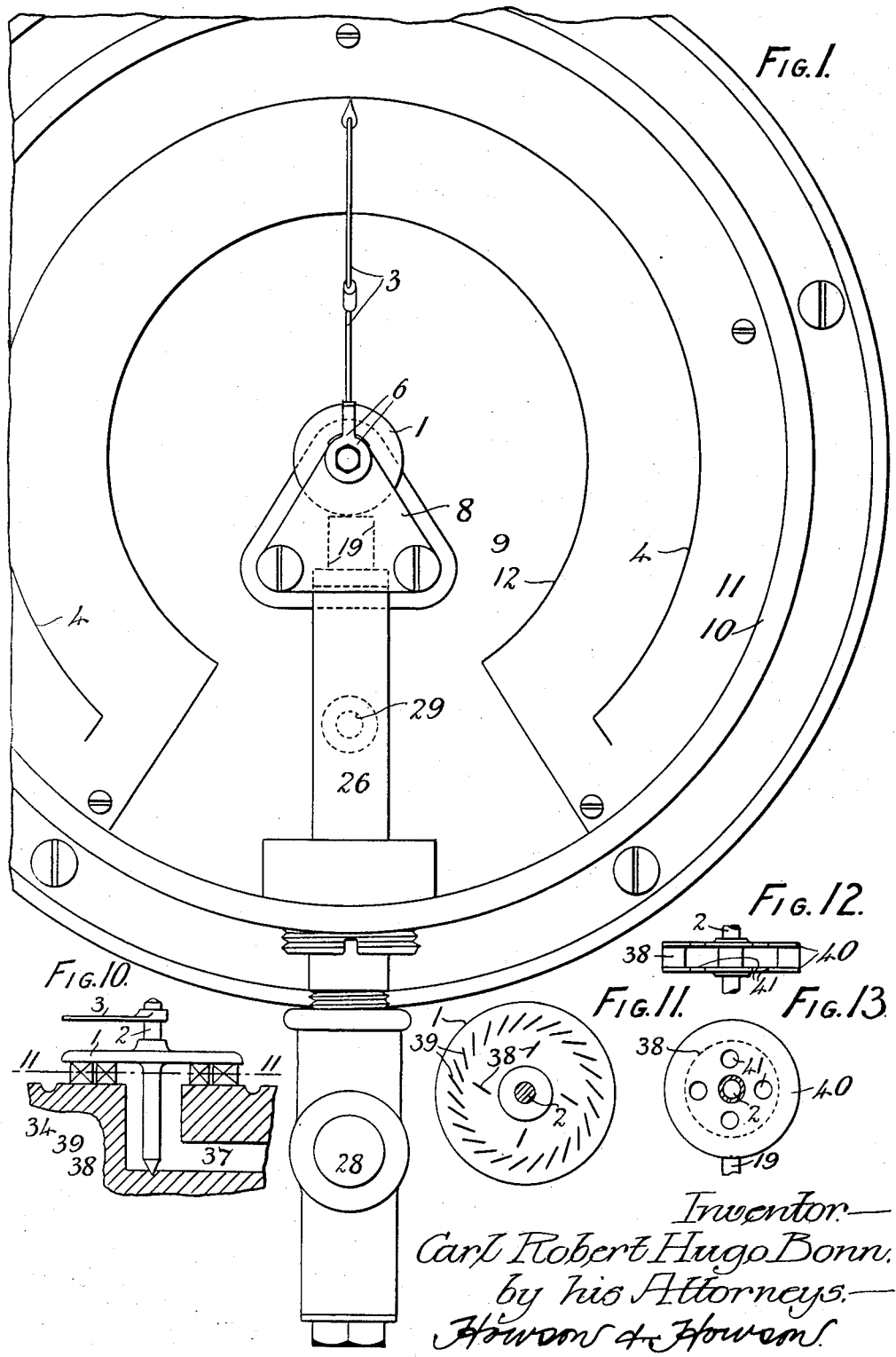

Patented Aug. 2, 1927.

1,637,927

UNITED STATES PATENT OFFICE.

CARL ROBERT HUGO BONN, OF HILLHEAD, GLASGOW, SCOTLAND.

FLOW METER.

Application filed January 25, 1924, Serial No. 688,629, and in Great Britain January 27, 1923.

This invention has reference to improvements in and relating to apparatus for indicating the pressure, velocity and/or volume of fluids and consists of an instrument comprising a turbine wheel or the like adapted to be rotated through a part of a circle against the action of a spring by the fluid acting upon its blades or the like. A pointer or the like is fitted or connected to the turbine wheel or the like so as to move with same.

When fluid acts upon the turbine blades or the like the turbine rotates against the action of the spring till the force acting upon the blades equals the force exerted by the spring when the turbine will come to rest with the pointer indicating the pressure, velocity and/or volume of the fluid passing through the apparatus according to the scale used.

The type of turbine or the like may be varied as desired to suit the nature of the fluid, that is, one type or construction of turbine wheel may be suitable for a gas such as air or steam while another construction or type of turbine wheel may be suitable for a liquid such as water.

In order that my said invention and the manner of carrying the same into effect or practice may be properly understood I have hereunto appended two sheets of explanatory drawings in which Figure 1 is a front elevation of an apparatus, constructed according to this invention, for indicating the pressure, velocity and/or volume of fluids while Figure 2 is a sectional elevation at right angles to Figure 1.

Figure 3 is an elevation, drawn to a larger scale than Figure 1, of the turbine of said apparatus and shows the turbine nozzle tube in section.

Figure 4 is a sectional elevation, drawn to a larger scale than Figure 3, of a part of the turbine disc, illustrating the turbine blades or the like and the nozzle for directing the fluid to the blades.

Figures 5, 5ª and 5ᵇ are sectional elevations of some of the turbine blades or teeth, drawn to a larger scale than Figure 4, and illustrating three modified constructions of blades or teeth.

Figure 6 is a sectional elevation and Figure 7 is an elevation at right angles to same of a modified construction of turbine apparatus.

Figures 8 and 9 are views similar to Figures 6 and 7 of a further modified construction of apparatus.

Figure 10 is a sectional elevation of a still further modified construction of apparatus and Figure 11 is an inverted sectional plan view taken on the line 11—11 of Figure 10.

Figures 12 and 13 are respectively an elevation and a plan view of a further modified construction of turbine apparatus.

Referring to these drawings:—

According to this invention and as illustrated by Figures 1 and 2 an instrument for indicating the pressure, velocity and/or volume of fluids consists of a disc member 1 adapted to rotate by being provided with central pivot pins, a spindle or the like 2, the ends of which may be pointed and/or provided with ball, roller or like bearings so as to minimize friction. A pointer or other indicating arm 3 is connected to this disc or to the disc spindle so as to move with it. A suitable scale 4 is located in a suitable position adjacent to the pointer 3. The disc is provided with a spring 5 having any suitable regulating and adjusting device or devices 6 so that the pointer 3 will give true readings on the scale 4. The disc spindle 2 is preferably provided with a balance wheel 7 and is carried by a bracket 8 secured to a back plate 9 which is provided with an outer circumferential flange or wall 10 to which a glass 11 is fitted. The back plate 9, circumferential flange 10 and glass 11 form a casing to contain the apparatus. An inner flange or wall 12 may be arranged concentrically within the outer wall 10 so that there is a chamber 13 between these two walls 10 and 12. A blade, paddle or the like 14 is secured to the pointer 3 and operates within this chamber 13 so as to steady the pointer 3 which moves over the scale 4 which is located in front of the chamber 13. The pointer 3 moves in front of the scale 4. Behind the scale 4, in the chamber 13 the blade 14 moves with the pointer 3. The air in the chamber 13 acts as a resistance upon the blade 14 as the latter moves through same and prevents or minimizes pointer vibrations.

The disc member 1 is provided with blades or the like such as passages or holes, either angled, radial, straight or curved so as to form a turbine wheel. Preferably these blades are formed by cutting a plurality of grooves 15 in the periphery of the disc 1. These grooves 15 may be straight across the periphery of the disc 1 parallel with the axis of the disc or they may be angled or curved. As shown by Figure 5 the walls of these grooves 15 are preferably angled, that is, they do not lie in a plane radial to the disc 1 but one wall 16 of each groove 15 may be under-cut so that it lies in a plane which is a tangent to a circle concentric with the disc 1 but of smaller diameter than the diameter of the disc while the other wall 17 of the groove 15 may be approximately parallel or may be inclined at an angle to the first mentioned and under-cut wall 16 so that the groove 15 may be of conical or of outwardly diverging formation in cross section. As shown by Figures 5ª and 5ᵇ these grooves 15 may if desired be formed by cutting teeth 18 round the periphery of the disc 1; the spaces between the teeth 18 forming the grooves 15. These teeth may be of any suitable shape in cross section. For example and as shown by Figure 5ª these teeth 18 may be similar in shape to ratchet teeth or as shown by Figure 5ᵇ they may be triangular in cross section.

The fluid is directed on to the blades or into the grooves 15 of the disc 1 in any suitable manner and rotates the disc 1 against the action of the spring 5 till the resistance force exerted by the spring equals the force exerted by the fluid passing through the apparatus. Preferably the fluid is conducted to the blades or into the grooves 15 by means of a nozzle suitably arranged and this nozzle preferably comprises a tube 19 having its one end closed by a closure plate 20 arranged close to the periphery of the disc 1. A suitably shaped passage 21 forming the nozzle is formed through this closure plate 20 and lies at a suitable angle as indicated by the line 22 (Figure 3) so as to direct the fluid on to the blades or into the grooves 15. Preferably the wall of the center part 23 of this passage 21 is cylindrical or parallel with the axis of the center line 22 of the passage while both ends 24 of the passage are conical or splayed outwards, that is, the nozzle 21 is preferably of the converging and diverging type.

Preferably and as illustrated by Figure 4 the ratio between the diameter of the exit end 24 of the nozzle 21 and the number of grooves 15 to the inch is such that the exit end of the nozzle extends over a plurality of grooves 15.

Preferably the face 25 of the closure plate 20 at the end of the nozzle tube 19 and adjacent to the periphery of the disc 1 is slightly dished or concave so as to fit closely, but with sufficient clearance, to the periphery of the disc 1.

By forming the face of the plate 20 of dished shape the leakage of fluid between the nozzle 21 and the periphery of the disc is minimized.

The fluid is conducted to the nozzle tube 19 through an extension tube 26 passing through the wall 10 which forms the casing containing the apparatus. Preferably the internal diameter of this tube 26 is greater than the internal diameter of the nozzle tube 19 so as to give impurities in the fluid an opportunity to settle. An inlet pipe 27 is connected to this extension tube 26 and is preferably provided with a stop valve 28. A filter or the like may be located between the pipes 26 and 27. At the lower part of the casing a discharge outlet 29 is provided.

If desired and as illustrated by Figures 6 and 7 the disc 1 forming the turbine wheel may be surrounded by a ring or casing 30. There would be sufficient clearance between this surrounding ring 30 and the periphery of the disc 1 to enable the disc to rotate freely. Both faces 31 of the disc 1 may be counter-sunk so that the edges 32 of the periphery or rim of the disc 1 are comparatively sharp edges. Preferably the edges 33 of the surrounding ring 30 are also comparatively sharp. On both sides of the nozzle tube 19 gutters 34 may be suitably arranged so as to carry away the discharged fluid.

In operation the fluid issues from the nozzle 21 impinges on the blades, or into the grooves 15 and is discharged sideways, that is, in a direction parallel with the axis of the disc 1 into the gutters 34. The fluid will by capillary attraction seal the clearance space between the edges 32 and 33 of the surrounding ring 30 and of the disc 1 so as to prevent fluid from being carried round by the disc 1 and loading same unevenly. When the fluid is a gas such as steam the turbine wheel 1 may be enclosed within an inner casing 35 and may be drained through a suitable outlet 36.

As the disc 1 is rotated the pointer 3 moves over the scale 4 and when the disc 1 comes to rest the pointer 3 will be indicating the pressure, velocity or volume of the fluid passing through the apparatus according to the scale used.

According to the modification illustrated by Figures 10 and 11 which is particularly suitable for dealing with liquids the fluid may be introduced at the center part of the disc member 1 by means of a passage 37 and pass radially outwards through curved or angled passages, blades or the like 38 fitted to the face of the disc 1 concentric with the axle or pivot pins 2. The stator member of the turbine arrangement is preferably provided with vanes or the like 39 arranged round the blades 38 of the rotor or disc member 1. Suitable arrangements such as a gutter 34 would be made for conducting the fluid away from the stator vanes 39.

This modification comprises an outward flow radial turbine but if desired the flow may be reversed so that the turbine may be of the inward flow radial type. In the latter case which is more suitable for gases the stator vanes may be dispensed with and the fluid may be directed on to the blades by means of nozzles or the like 21. In this case the disc member as illustrated by Figures 12 and 13 may consist of two discs 40 arranged a suitable distance apart with the blades 38 located between them. Openings 41 would be made in the disc 40 within the circle or space occupied by the blades 38 so as to permit the free exit of the fluid and prevent back pressures.

Preferably the apparatus illustrated by Figures 1 and 2 is used when it is desired to indicate the pressure of a gas such as air. When the pressure of steam or other gas which may have an undesirable effect upon the scale 4 or glass 11 is to be indicated the modification illustrated by Figures 8 and 9 is preferably used. When the pressure of a liquid such as water is to be indicated the modification illustrated by Figures 6 and 7 is preferably used and the gutters 34 would be connected to a discharge pipe adapted to conduct the discharge fluid through the discharge outlet 29 so as to prevent the flooding of the lower part of the apparatus.

The modifications illustrated by Figures 10 to 13 may be used for indicating the pressure of liquids or of gases.

When it is desired to indicate the velocity of fluids, a velocity scale instead of a pressure scale is provided and similarly when it is desired to indicate the volume of fluids passing through the apparatus a volume scale is used. In the latter case it will be readily understood that the apparatus would require to be large enough to enable all the fluid to pass through same.

I claim:

1. In combination, a turbine wheel having transverse blades; resilient means for controlling said wheel; regulating means for said resilient means; means responsive to a movement of said turbine wheel; and a nozzle adapted to direct fluid into said blades so as to rotate said wheel against the action of said resilient means.

2. In combination, a turbine wheel having transverse blades; resilient means for controlling said wheel; regulating means for said resilient means; means responsive to a movement of said turbine wheel; and a nozzle adapted to direct fluid on to said wheel so as to rotate the same against the action of said resilient means, the ratio of the diameter of the exit end of said nozzle to the number of blades to the inch on said wheel being such that said exit end of the nozzle extends over a plurality of blades.

3. Apparatus operated by the flow of fluids comprising a turbine wheel having blades; resilient means for controlling said wheel; and a nozzle tube provided with a closure plate, the latter having a nozzle passage, the face of said plate being dished to form a close fit with said turbine wheel.

4. In combination, a disc member forming a turbine wheel; a spring controlling said turbine wheel; a nozzle adapted to direct fluid onto said turbine wheel so as to rotate the same against the action of said spring; a nozzle tube; and a supply pipe connected to said nozzle tube having an internal diameter substantially larger than that of said nozzle tube.

5. Indicating apparatus operated by the flow of fluids and comprising an outer casing; an inner casing arranged within said outer casing; a disc member mounted within said inner casing; a spring adapted to control the rotary movement of said disc; a pointer moved by said disc; a scale; blades round the periphery of said disc; a nozzle adapted to conduct fluid to said blades; and passages for the discharge of said fluid.

CARL ROBERT HUGO BONN.